US012217630B2

(12) United States Patent
Eaglin

(10) Patent No.: US 12,217,630 B2
(45) Date of Patent: Feb. 4, 2025

(54) PANORAMIC FENCING

(71) Applicant: Jemeyel Eaglin, Houston, TX (US)

(72) Inventor: Jemeyel Eaglin, Houston, TX (US)

(73) Assignee: Jemeyel Eaglin, Houston, TX (US)

( * ) Notice: Subject to any disclaimer, the term of this patent is extended or adjusted under 35 U.S.C. 154(b) by 126 days.

(21) Appl. No.: 18/175,027

(22) Filed: Feb. 27, 2023

(65) Prior Publication Data

US 2023/0274672 A1 Aug. 31, 2023

Related U.S. Application Data

(60) Provisional application No. 63/268,528, filed on Feb. 25, 2022.

(51) Int. Cl.

*E04H 17/16* (2006.01)
*E04H 17/20* (2006.01)
*G09F 13/20* (2006.01)
*G09F 17/00* (2006.01)

(52) U.S. Cl.

CPC ........... *G09F 13/20* (2013.01); *E04H 17/166* (2013.01); *E04H 17/20* (2013.01)

(58) Field of Classification Search

CPC ...... G09F 15/0025; G09F 19/22; G09F 17/00; G09F 15/0006; G09F 15/0037; G09F 19/18; E06B 2009/002; E06B 11/02; E04H 17/063; E04H 17/00; E04H 17/017

See application file for complete search history.

(56) References Cited

U.S. PATENT DOCUMENTS

| | | | | |
|---|---|---|---|---|
| 1,412,769 A | 4/1922 | Parks | | |
| 5,200,240 A * | 4/1993 | Baker | E04F 11/1853 | 52/690 |
| 6,510,663 B2 * | 1/2003 | Jourden | E04B 2/7433 | 52/282.1 |
| 6,719,276 B1 | 4/2004 | Bush | | |
| 7,240,637 B2 * | 7/2007 | Rosen | A01K 3/00 | 119/524 |
| 7,870,686 B2 * | 1/2011 | Hines | G09F 19/22 | 40/442 |
| 7,997,560 B2 * | 8/2011 | Bergdoll | E04H 17/066 | 256/67 |
| 8,006,435 B2 | 8/2011 | DeBlonk et al. | | |
| 8,272,624 B1 * | 9/2012 | Frazier | E04H 17/063 | 256/32 |
| 8,327,565 B2 * | 12/2012 | Boltz | G09F 17/00 | 40/606.18 |
| 8,336,236 B2 | 12/2012 | Boltz et al. | | |
| 8,615,913 B1 * | 12/2013 | Hunsucker | G09F 15/0037 | 40/594 |
| 8,732,999 B1 * | 5/2014 | Hughes | G09F 15/0025 | 160/329 |
| 9,741,268 B2 * | 8/2017 | Stephanopoulos | G09F 7/18 | |
| 10,081,980 B2 * | 9/2018 | Birkert | E06B 9/04 | |

(Continued)

FOREIGN PATENT DOCUMENTS

| | | |
|---|---|---|
| CN | 103397806 A | 11/2013 |
| EP | 2278097 A1 | 1/2011 |

(Continued)

*Primary Examiner* — Shin H Kim

(74) *Attorney, Agent, or Firm* — Perkins Coie LLP; Michael Glenn

(57) ABSTRACT

Panoramic fencing includes features that impart a dynamic appearance to fencing.

23 Claims, 6 Drawing Sheets

(56) References Cited

U.S. PATENT DOCUMENTS

| | | | | |
|---|---|---|---|---|
| 10,094,166 | B2 * | 10/2018 | Reiner | E06B 9/40 |
| 10,100,574 | B2 * | 10/2018 | Reiner | E06B 9/60 |
| 10,386,715 | B2 | 8/2019 | Yett | |
| 10,410,553 | B2 * | 9/2019 | Holyfield | G09F 17/00 |
| 10,550,634 | B1 * | 2/2020 | Holland | E06B 9/06 |
| 2004/0211100 | A1 * | 10/2004 | Scherba | G09F 15/0025 40/560 |
| 2004/0217340 | A1 | 11/2004 | Bergdoll | |
| 2005/0263093 | A1 | 12/2005 | Rosen | |
| 2008/0251656 | A1 * | 10/2008 | Prismall | G09F 15/0037 256/65.01 |
| 2008/0276507 | A1 * | 11/2008 | Hines | G09F 19/22 40/541 |
| 2009/0071050 | A1 * | 3/2009 | Hines | G09F 19/22 40/564 |
| 2010/0200823 | A1 * | 8/2010 | Ringus | E04H 17/063 256/1 |
| 2010/0265319 | A1 * | 10/2010 | Kadoch | G09F 15/0006 348/51 |
| 2011/0038030 | A1 * | 2/2011 | Roosendaal | G09F 9/372 359/296 |
| 2011/0079181 | A1 * | 4/2011 | Craig | A01K 1/0017 119/416 |
| 2011/0219654 | A1 * | 9/2011 | Kroon | G09F 15/0025 40/607.04 |
| 2012/0073170 | A1 | 3/2012 | Boltz et al. | |
| 2012/0139956 | A1 * | 6/2012 | Joseph | G09G 3/3406 345/55 |
| 2013/0175487 | A1 * | 7/2013 | Dettor | E04H 17/063 256/37 |
| 2013/0221301 | A1 * | 8/2013 | Cowie | E04H 17/00 256/24 |
| 2015/0235580 | A1 * | 8/2015 | Iglesias Ballester | G09F 11/08 40/617 |
| 2023/0193616 | A1 * | 6/2023 | Beck, III | E02D 5/28 52/274 |
| 2023/0274672 | A1 * | 8/2023 | Eaglin | G09F 19/22 40/544 |
| 2024/0159079 | A1 * | 5/2024 | Yang | E04H 17/16 |

FOREIGN PATENT DOCUMENTS

| | | | |
|---|---|---|---|
| EP | 1750240 | B1 | 7/2011 |
| WO | 2006020991 | A2 | 2/2006 |

* cited by examiner

FIGURE 1 – PRIOR ART

PANORAMIC FENCING

CROSS-REFERENCE TO RELATED APPLICATIONS

This application claims priority to U.S. Provisional Patent Application No. 63/268,528 filed Feb. 25, 2022, which application is incorporated by reference herein in its entirety by this reference thereto.

TECHNICAL FIELD

Various of the disclosed embodiments concern panoramic fencing.

BACKGROUND

A fence is a structure that encloses an area, typically outdoors, and is usually constructed from posts that are connected by boards, wire, rails, or netting. FIG. 1 shows a perspective view of a typical fence 10 in which a series of timber or round posts 12 are set in soil 17 and crushed rock 13 and topped with more soil 18. During construction, the fence is kept in alignment with guidelines 16 stretched between the posts. Several horizontal stringers 14 join the posts. Vertical poles 15 are attached to the horizontal stringers.

While there are many types of fences that are used to secure and screen property, other than simple, static decorative schemes, such as painting, wrapping in coverings, or applying other static ornamentation, little or no attention has been paid to providing a dynamic or panoramic appearance to fencing.

SUMMARY

Embodiments of the invention provide panoramic fencing which includes features that impart a dynamic appearance to fencing.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Panoramic Fencing

Embodiments of the invention provide panoramic fencing which includes features that impart a dynamic appearance to fencing. The appearance is deemed to be dynamic because it is readily alterable. For example, the fence may appear at one instant to be transparent and thereafter, if desired, it may be set to be opaque and provide privacy. The fence may appear to have a design or advertising, each of which is readily altered as desired. For example, advertising can be displayed on the fence for a sale or other promotion and then changed for another sale or promotion. Such advertising may be animated if desired. A design may be changed as desired, or an illustration may be displayed. For example, the fence may display scenery or landscaping. Such scenery or landscaping may be displayed in a way that causes the structure behind the fence to become part of the scene. The display may be changed with the seasons to show, for example, snow during the winter, etc. Because the fence displays local landscaping and/or scenery, it becomes part of the setting of the structure, screens the structure, and provides privacy.

Figure 1:
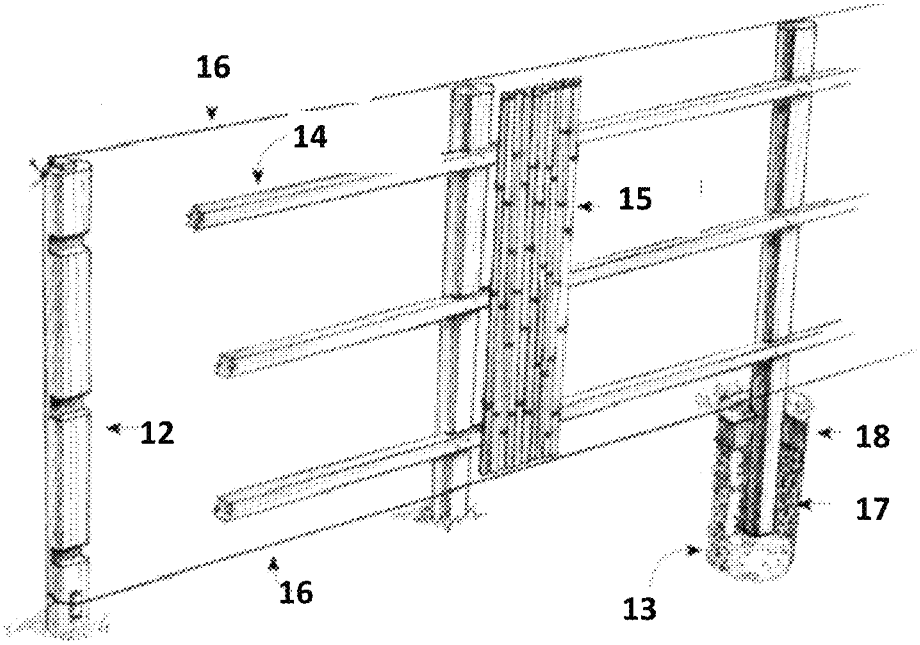
FIG. 1 shows a perspective view of a typical fence.
Figure 2:
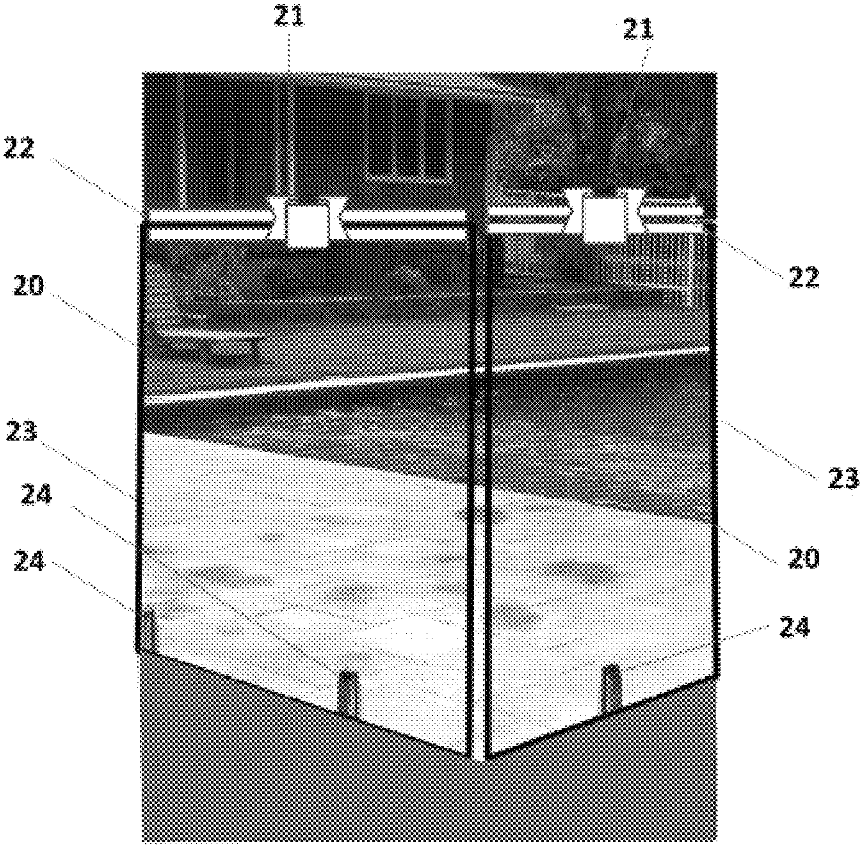
FIG. 2 shows a perspective view of a panoramic fence according to the invention.

FIG. 2 shows a perspective view of a panoramic fence according to an embodiment of the invention. In embodiments, a selectably transparent pane is used to form the vertical fence sections. The selectably transparent pane attaches to the fence frame. The selectably transparent pane may comprise any of a glass, polycarbonate, plexiglass, or other nominally transparent panel 20. The selectably transparent pane attaches to the fence frame from side post 23 to side post 23 and top cap 22 to side post 23. The panel also fits snugly inside of alternate slits (not shown) on each side of the frame. The frame also allows adjustments tailored to fit the requirements of fencing codes and according to each property's circumference and fence height.

In embodiments, the top cap 22 includes a track that adjustably secures a projector 21 which is used to form images on the selectably transparent panes. The projector may be slid along the track as desired to project an image onto the selectably transparent pane. In such embodiment, the selectably transparent pane is configured for rear projection, where the image casts onto the backside of a screen, in this case the selectably transparent pane. Because the selectably transparent pane absorbs the reflected light from the projector, ambient light on the front side of the selectably transparent pane is not much of an issue.

Software is used to warp the image appropriately so that it appears perspectively accurate when viewed as part of the fence. The projector may be controlled and provided with data to form images for projection onto the transparent panes by Bluetooth, Wi-Fi, or any other suitable communication medium.

Further, it is not necessary to have a one-to-one correspondence between the selectably transparent panes and one or more projectors. Rather, each projector may be configured with an array of mirrors or other such mechanism that diverts the image in a controlled way to multiple selectably transparent panes. This can be done at a rapid rate, e.g. 30 frame per second, such that imagery is displayed seamlessly on multiple selectably panes in an apparently simultaneous fashion using a single projector.

In embodiments, the projector is magnetically secured to the top cap, although other securing mechanisms may be used, such as clamps, screws, and the like. Further, the projector may be mounted on a side post or may be mounted at or near the ground to project the image upwardly onto the fence. In embodiments the track may include electrical connections that mate to respective connections on the projectors and thus power the projectors. Such connections are sealed to protect against damage or short circuits that may be caused by the outside exposure encountered by the fence. Likewise, the projector is weatherproofed.

In other embodiments the selectably transparent panel may comprise a smart glass or switchable glass, e.g. electrochromic glass, that is mounted to the posts and or rails in a similar fashion to that of the transparent pane. One manufacturer of smart glass is Smart Glass International (https://www.smartglassinternational.com/).

Smart glass is a glass or glazing whose light transmission properties are altered when voltage, light, or heat is applied. In general, the glass changes from transparent to translucent and vice versa, changing from letting light pass through to blocking some (or all) wavelengths of light and vice versa. Smart glass can be constructed by lamination with a smart film or switchable film, often using either glass, acrylic or polycarbonate laminates. When the glass is transparent, one can see into or out of the fenced area, and when it is non-transparent it can be used as a projection screen, such that the fence has a decorative appearance, which can be a design, an illustration, or a photo display such as landscaping or a scenic view. When the glass is in a cloudy or opaque state the fence protects privacy. The glass may also be used for advertising. For example, the glass can be used as a switchable projection screen for advertising or to display an image.

In other embodiment the selectably transparent pane may comprise a video display, such as an LCD or plasma display. In this arrangement a projector is not used. Rather, the dynamic aspect of the fence is effected by the display itself.

In embodiments, an app controls operation of the fence. The app controls operation of both the projectors and the transparency of the fence panels if smart glass is used for the selectably transparent panels.

Figure 3:
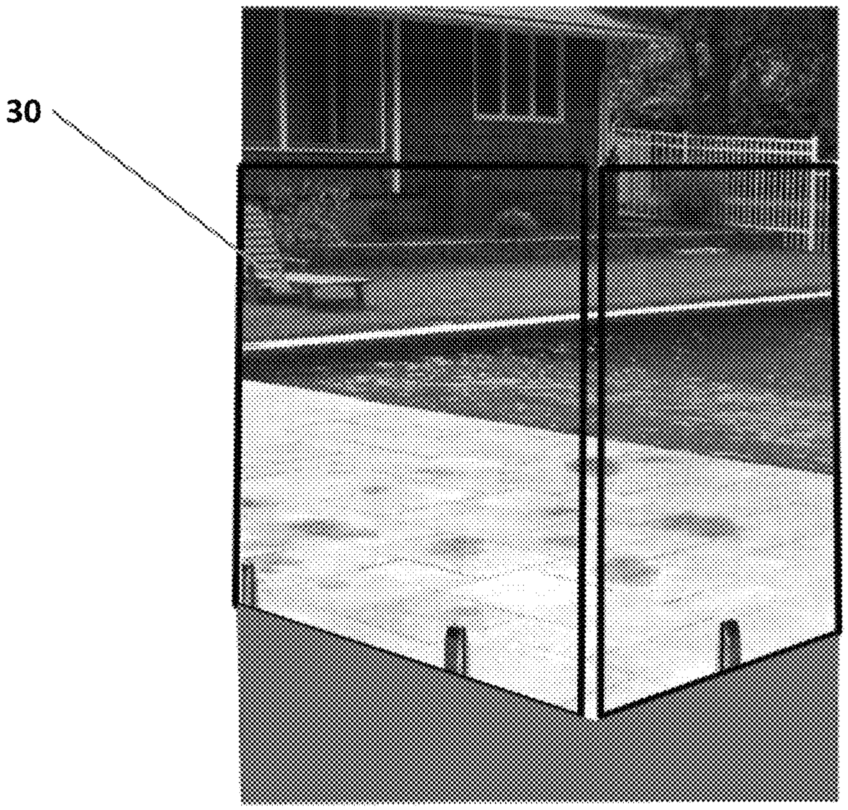
FIG. 3 shows a perspective view of a panoramic fence according to the invention in which the fence is set to be transparent.

FIG. 3 shows a perspective view of a panoramic fence according to the invention in which the fence is set to be transparent. In this setting the fence is clear and merely provides a physical, but not visual, barrier. In FIG. 3, the fence 30 allows the structures behind the fence to be seen.

Figure 4:
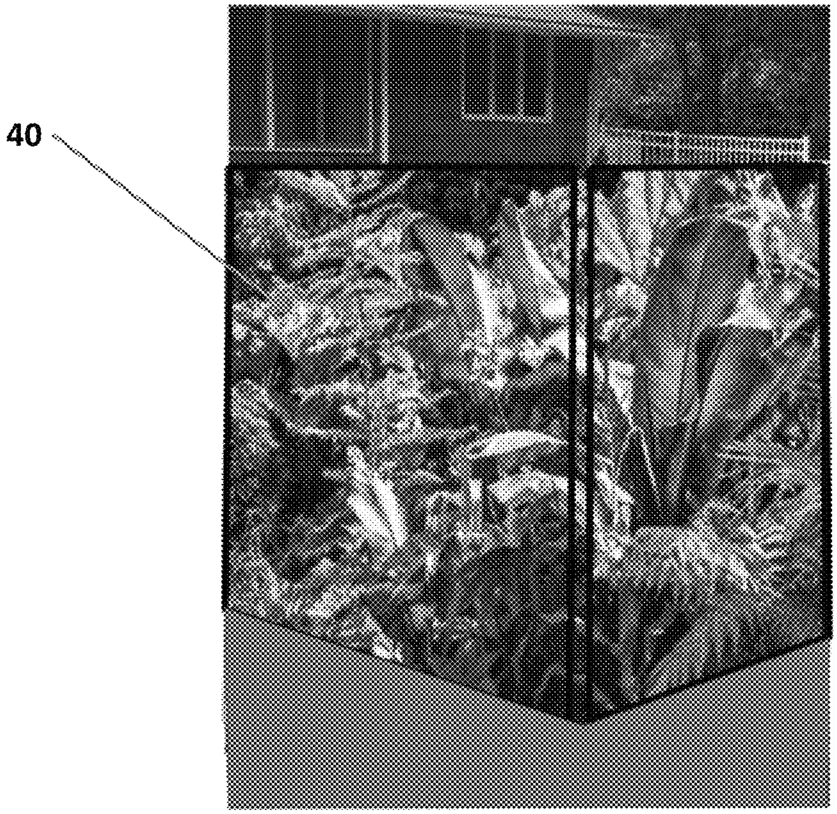
FIG. 4 shows a perspective view of a panoramic fence according to the invention in which the fence is set to display illustrations, graphics, or designs.

FIG. 4 shows a perspective view of a panoramic fence according to the invention in which the fence is set to display illustrations, graphics, or designs. In this setting the fence displays an image of ornamental plantings 40 that screen the structure, in this case a home and a pool.

Figure 5:
FIG. 5 shows a perspective view of a panoramic fence according to the invention in which the fence is set to display advertising.

FIG. 5 shows a perspective view of a panoramic fence according to the invention in which the fence is set to display advertising 50. The advertising may be animated if desired.

As can be seen, the panoramic fence herein disclosed provides a medium on which to display a variety of images, designs, messages, and the like, while being operable through various degrees of opacity to provide screening or to allow light in.

Processing System

Figure 6:
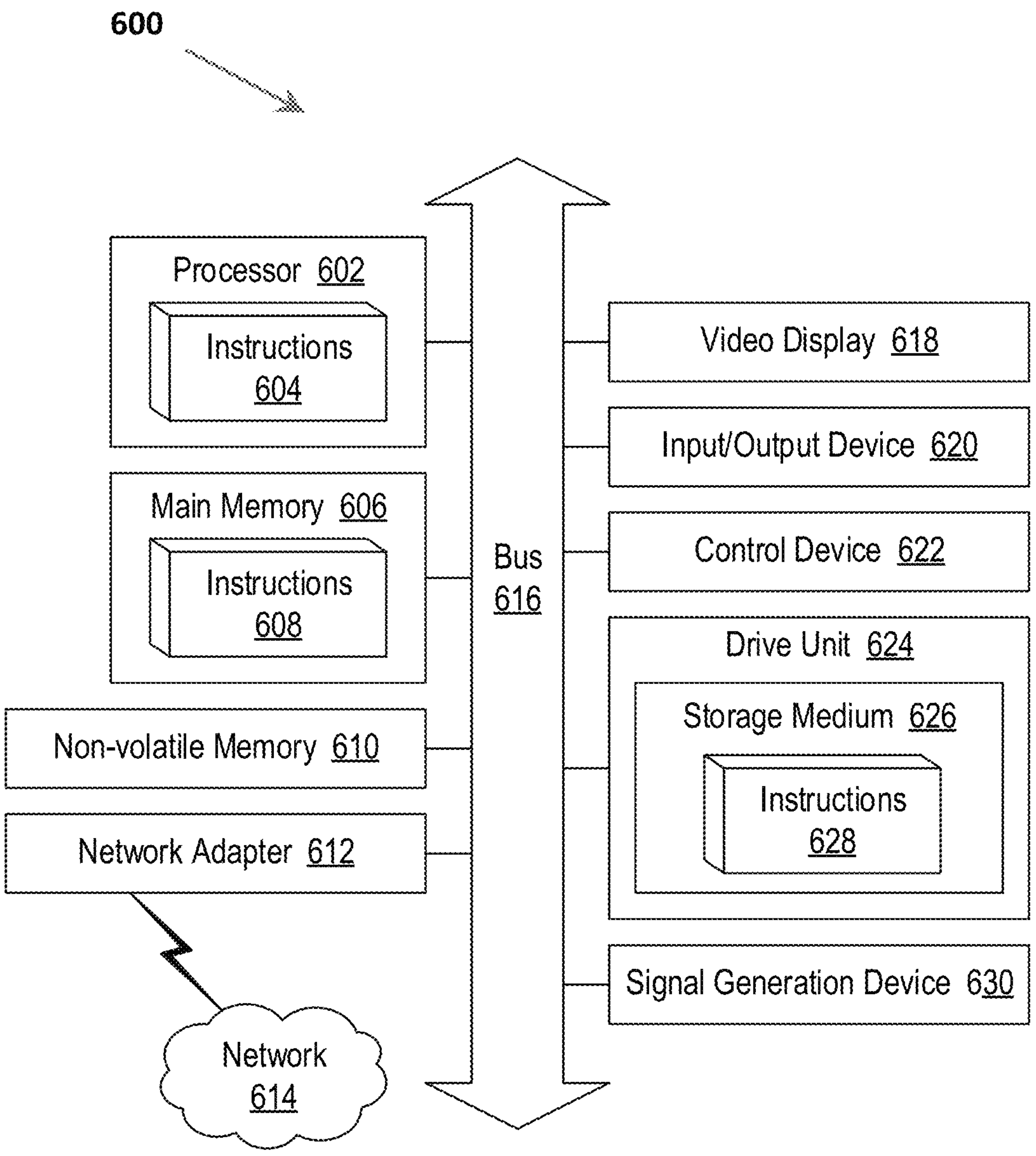
FIG. 6 is a block diagram illustrating an example of a processing system in which at least some operations described herein can be implemented.

FIG. 6 is a block diagram illustrating an example of a processing system 600 in which at least some operations described herein can be implemented. For example, components of the processing system 600 may be hosted on a computing device that includes a threat detection platform. As another example, components of the processing system 600 may be hosted on a computing device that is queried by a threat detection platform to acquire emails, data, etc.

The processing system 600 may include a central processing unit (also referred to as a "processor") 602, main memory 606, non-volatile memory 610, network adapter 612, e.g. a network interface), video display 618, input/output device 620, control device 622, e.g. a keyboard or pointing device), drive unit 624 including a storage medium 626, and signal generation device 630 that are communicatively connected to a bus 616. The bus 616 is illustrated as an abstraction that represents one or more physical buses or point-to-point connections that are connected by appropriate bridges, adapters, or controllers. The bus 616, therefore, can include a system bus, a Peripheral Component Interconnect (PCI) bus or PCI-Express bus, a Hyper Transport or industry standard architecture (ISA) bus, a small computer system interface (SCSI) bus, a universal serial bus (USB), inter-integrated circuit (I2C) bus, or an Institute of Electrical and Electronics Engineers (IEEE) standard 1394 bus (also referred to as "Firewire").

The processing system 600 may share a similar processor architecture as that of a desktop computer, tablet computer, mobile phone, game console, music player, wearable electronic device, e.g. a watch or fitness tracker), network-connected ("smart") device, e.g. a television or home assistant device), virtual/augmented reality systems, e.g. a head-mounted display), or another electronic device capable of executing a set of instructions (sequential or otherwise) that specify actions to be taken by the processing system 600.

While the main memory 606, non-volatile memory 610, and storage medium 626 are shown to be a single medium, the terms "machine-readable medium" and "storage medium" should be taken to include a single medium or multiple media, e.g. a centralized/distributed database and/or associated caches and servers) that store one or more sets of instructions 628. The terms "machine-readable medium" and "storage medium" shall also be taken to include any medium that is capable of storing, encoding, or carrying a set of instructions for execution by the processing system 600.

In general, the routines executed to implement the embodiments of the disclosure may be implemented as part of an operating system or a specific application, component, program, object, module, or sequence of instructions (collectively referred to as "computer programs"). The computer programs typically comprise one or more instructions, e.g. instructions 604, 608, 628) set at various times in various memory and storage devices in an electronic device. When read and executed by the processors 602, the instructions cause the processing system 600 to perform operations to execute elements involving the various aspects of the present disclosure.

Moreover, while embodiments have been described in the context of fully functioning electronic devices, those skilled in the art will appreciate that some aspects of the technology are capable of being distributed as a program product in a variety of forms. The present disclosure applies regardless of the particular type of machine- or computer-readable media used to effect distribution.

Further examples of machine- and computer-readable media include recordable-type media, such as volatile and non-volatile memory devices 610, removable disks, hard disk drives, and optical disks, e.g. Compact Disk Read-Only Memory (CD-ROMS) and Digital Versatile Disks (DVDs)), and transmission-type media, such as digital and analog communication links.

The network adapter 612 enables the processing system 600 to mediate data in a network 614 with an entity that is external to the processing system 600 through any communication protocol supported by the processing system 600 and the external entity. The network adapter 612 can include a network adaptor card, a wireless network interface card, a router, an access point, a wireless router, a switch, a multilayer switch, a protocol converter, a gateway, a bridge, a bridge router, a hub, a digital media receiver, a repeater, or any combination thereof.

The network adapter 612 may include a firewall that governs and/or manages permission to access/proxy data in a network. The firewall may also track varying levels of trust between different machines and/or applications. The firewall can be any number of modules having any combination of hardware, firmware, or software components able to enforce a predetermined set of access rights between a set of machines and applications, machines and machines, or applications and applications, e.g. to regulate the flow of traffic and resource sharing between these entities). The firewall may additionally manage and/or have access to an access control list that details permissions including the access and operation rights of an object by an individual, a machine, or an application, and the circumstances under which the permission rights stand.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

I claim:

1. A panoramic fence, comprising:

a plurality of fence sections, each fence section comprising a selectably transparent pane attached to a fence frame;

said fence frame comprising a plurality of vertical side posts and a horizontal top cap extending between said side posts; and a projector configured to selectably display a variety of images, designs, messages, and the like, on at least one of said selectably transparent panes;

said top cap comprising a track that adjustably secures said projector thereto;

wherein said selectably transparent panes are operable through various degrees of opacity to provide screening or to transmit light therethrough;

wherein said transparent pane imparts a dynamic, readily alterable appearance to the fence in which said fence is configured to appear at one instant to be transparent and thereafter, as selected, to appear to be opaque and/or appear to display a selected design, image, illustration, or advertising;

and wherein said projector is selectably slidable along said track to position said projector to project an image onto said selectably transparent pane.

2. The fence of claim 1, wherein said selectably transparent pane comprises any of a glass, polycarbonate, plexiglass, or other nominally transparent pane; a smart glass or switchable glass; or a video display comprising an LCD, LED, or a plasma display.

3. The fence of claim 1, wherein said selectably transparent pane displays images from said projector comprising any of static advertising, animated advertising or images, illustrations, scenery, or landscaping.

4. The fence of claim 3, wherein the display of said scenery or landscaping on said selectably transparent pane obscures a structure behind the fence wherein the fence blends into the scenery.

5. The fence of claim 3, wherein the image displayed on said selectably transparent pane is changed with the seasons.

6. The fence of claim 1, wherein the selectably transparent pane is configured for rear projection, wherein the image from the projector is cast onto a backside of the selectably transparent pane.

7. The fence of claim 1, further comprising:

computer software configured to warp the image from the projector to appear perspectively accurate when viewed as part of the fence.

8. The fence of claim 1, wherein the projector is controlled and provided with data to form images for projection onto the selectably transparent panes by any of Bluetooth, Wi-Fi, or any other suitable communication medium.

9. The fence of claim 1, wherein there is an unequal correspondence between a number of selectably transparent panes and a number of projectors; and wherein there are more selectably transparent panes than projectors.

10. The fence of claim 9, wherein each projector comprises a mechanism that sequentially diverts a series of images from the projector to multiple selectably transparent panes;

wherein imagery appears to be simultaneously displayed seamlessly on multiple selectably transparent panes using a single projector.

11. The fence of claim 1, wherein said projector is magnetically secured to said top cap.

12. The fence of claim 1, wherein said projector is mounted to said fence frame at or near the ground to project the image upwardly onto the selectably transparent pane.

13. The fence of claim 1, wherein said track comprises electrical connections that mate to respective connections on said projector to power said projector.

14. The fence of claim 1, further comprising:

an app configured to control operation of said projectors and/or transparency of said selectably transparent panes.

15. A fencing method, comprising:

providing a plurality of fence sections, each fence section comprising a selectably transparent pane attached to a fence frame;

wherein said fence frame comprises a plurality of vertical side posts and a horizontal top cap extending between said side posts; and providing a projector configured to selectably display a variety of images, designs, messages, and the like, on at least one of said selectably transparent panes;

wherein said top cap comprises a track that adjustably secures said projector thereto;

operating said selectably transparent panes through various degrees of opacity to provide screening or to transmit light therethrough;

with said transparent pane, imparting a dynamic, readily alterable appearance to the fence in which said fence is configured to appear at one instant to be transparent and thereafter, as selected, to appear to be opaque and/or appear to display a selected design, image, illustration, or advertising; and selectably sliding said projector along said track to position said projector to project an image onto said selectably transparent pane.

16. The method of claim 15, wherein said selectably transparent pane comprises any of a glass, polycarbonate, plexiglass, or other nominally transparent pane; a smart glass or switchable glass; or a video display comprising an LCD, LED, or a plasma display.

17. The method of claim 15, further comprising; displaying images from said projector comprising any of static advertising, animated advertising or images, illustrations, scenery, or landscaping on said selectably transparent pane.

18. The method of claim 17, wherein the display of said scenery or landscaping on said selectably transparent pane obscures a structure behind the fence wherein the fence blends into the scenery.

19. The method of claim 17, further comprising: changing the image displayed on said selectably transparent pane with the seasons.

20. The method of claim 15, further comprising: configuring the selectably transparent pane for rear projection, wherein the image from the projector is cast onto a backside of the selectably transparent pane.

21. The method of claim 15, further comprising: using computer software to warp the image from the projector to appear perspectively accurate when viewed as part of the fence.

22. The method of claim 15, wherein there is an unequal correspondence between a number of selectably transparent panes and a number of projectors; and wherein there are more selectably transparent panes than projectors.

23. The method of claim 22, further comprising; sequentially diverting a series of images from the projector to multiple selectably transparent panes; wherein imagery appears to be simultaneously displayed seamlessly on multiple selectably transparent panes using a single projector.

* * * * *